US008523504B1

United States Patent
Hill

(10) Patent No.: US 8,523,504 B1
(45) Date of Patent: Sep. 3, 2013

(54) LICENSE PLATE SECURITY LOCK

(76) Inventor: Timothy Neil Hill, Odenton, MD (US)

( * ) Notice: Subject to any disclaimer, the term of this patent is extended or adjusted under 35 U.S.C. 154(b) by 67 days.

(21) Appl. No.: 13/385,564

(22) Filed: Feb. 27, 2012

(51) Int. Cl.
*A47G 3/00* (2006.01)

(52) U.S. Cl.
USPC .......................................... 411/374; 411/432

(58) Field of Classification Search
USPC .................. 411/103, 104, 204, 372.5, 372.6, 411/374, 432
See application file for complete search history.

(56) References Cited

U.S. PATENT DOCUMENTS

| | | | | |
|---|---|---|---|---|
| 1,653,339 A | * | 12/1927 | Carman et al. | 411/204 |
| 5,074,730 A | * | 12/1991 | Duran | 411/403 |
| 5,795,029 A | * | 8/1998 | Ma | 297/440.16 |
| 5,890,859 A | * | 4/1999 | Hasnik | 411/372 |
| 6,457,923 B1 | * | 10/2002 | Grossman | 411/104 |
| 6,478,518 B1 | * | 11/2002 | Hwang | 411/104 |

\* cited by examiner

*Primary Examiner* — Roberta Delisle

(57) ABSTRACT

A license plate security device comprises a spin barrel into which a license plate mounting machine screw is inserted. These are inserted into a spin barrel assembly with a closed bottom and an open top. The license plate is installed on the vehicle using at least one of these license plate security devices, more machine screws, and an ordinary screwdriver. A machined slug is inserted into the opened end of the spin barrel and secured by security set screw to keep from getting access to the head of the machine screw. With slug in place it helps keep out dirt, water, and rust. Removing the license plate now requires a security tool to remove the security set screw from the spin barrel and slug to access the head of the machine screw. Turning the spin barrel only will not remove the machine screw because it cannot transmit enough torque.

2 Claims, 5 Drawing Sheets

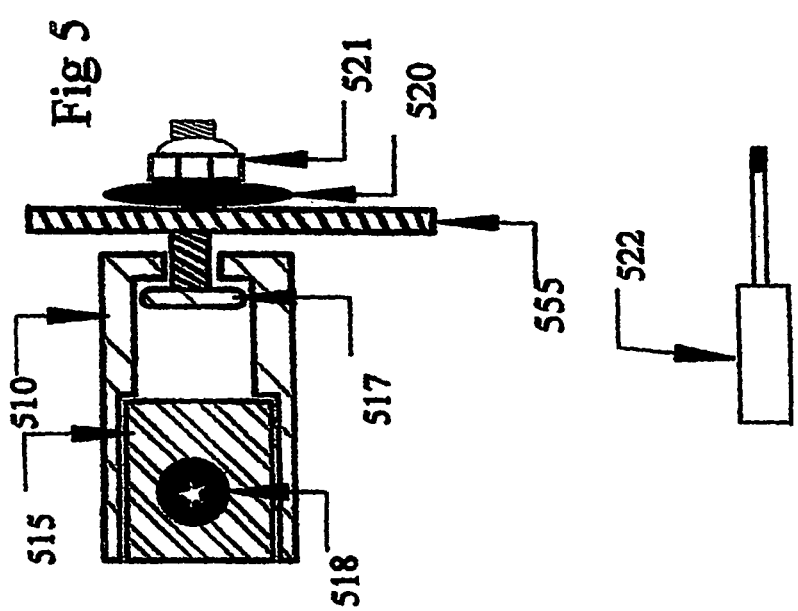

LICENSE PLATE SECURITY LOCK

BACKGROUND OF THE INVENTION

1. Field of the Invention

The present invention relates to vehicle license plate security devices, and in particular to locking devices that deny access to one or more of the machine screws mounting a license plate to a vehicle.

2. Description of the Prior Art

License plates on cars are easy to install and remove. Most often just four screws hold them on and an ordinary screwdriver is all you need for the job. Car thieves, gas station pump-and-run thieves, and bank robbers all now seem to assume a freshly stolen license plate will help throw the police off the trail if their cars are spotted. The police will pounce on innocent victims and presuppose the victims are the true subjects until proven otherwise.

The victims of license plate thefts are often unaware of the loss until a traffic officer stops them and cites them. Replacing the missing licenses and tags requires more fees to be paid and a trip to the DMV offices. Such offices are usually inhospitable, quite distant, have long waiting lines, and their business hours coincide with the victim's job shift. Getting cited means paying fines and making court appearances. The stolen tag can be part of identity theft for red light, speed cameras, parking and traffic citations.

What is needed is a license plate security device that is strong, includes a high quality lock, and covers one or more of the mounting screws. Removing the plate should require the use of a security tool.

SUMMARY OF THE INVENTION

Briefly, a license plate security device embodiment of the present invention comprises a license plate mounting machine screw inserted into a spin barrel assembly with a closed bottom and an open top such that the license plate mounting machine screw protrudes through a small hole in the bottom. The license plate is installed on the vehicle using at least one of these license plate security devices, more machine screws, and a screwdriver. A slug is inserted into the open end of the spin barrel and covers the head of the machine screw with the slug inserted it will help keep water, dirt, and ice off of machine screw to prevent rust and tag discoloration. When the slug is installed you then insert the security set screw. Removing the license plate now requires a security tool to remove the security set screw from the spin barrel and remove slug to access the head of the machine screw. Turning the spin barrel only will not remove the machine screw because the machined aluminum bottom creates a slip joint and will not transmit enough torque.

These and other objects and advantages of the present invention will no doubt become obvious to those of ordinary skill in the art after having read the following detailed description of the preferred embodiments which are illustrated in the various drawing figures.

IN THE DRAWINGS

FIG. 5 is an assembly and cross-sectional view diagram of a license plate security device embodiment of the present invention showing the spin barrel and license plate in cross section view; installed on a motorcycle, trailer, or truck needing a washer and nylon insert locking nut.

DETAILED DESCRIPTION OF THE PREFERRED EMBODIMENT

Figure 1:
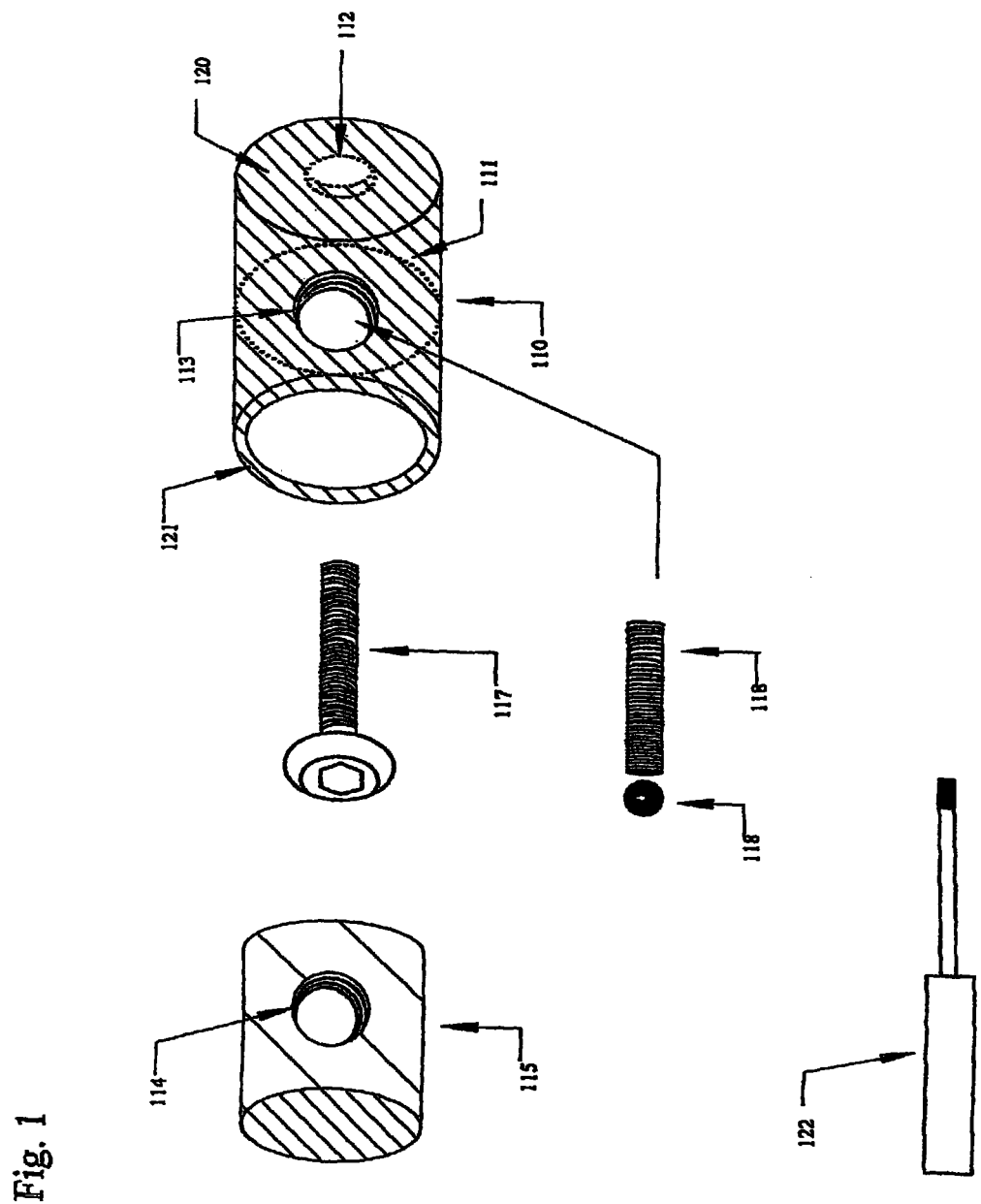
FIG. 1 is an exploded assembly view diagram of a license plate security device embodiment of the present invention.

FIG. 1 represents a license plate security device embodiment of the present invention. The license plate security device is intended to make at least one license plate mounting bolt inaccessible to tools unless the matching security tool is on-hand.

License plate security device typically uses a machine screw 117 which can be inserted through a hole in spin barrel bottom 112 in a closed end 120 of a spin barrel 110. The spin barrel 110 is generally in the form of a hollow cylinder with center lip 111 and closed bottom 120 and an open top of spin barrel 121.

The spin barrel bottom 120 is machined to keep machine screw 117 from spinning.

A machined slug 115 is sized to fit completely inside the open end 121 and rest on lip 111 of the spin barrel 110 and to lock in place so as to deny tool access to the head of the license plate mounting machine screw 117. A security set screw 118 is inserted through threads in spin barrel 113 and into machined slug 115 using threads in slug 114.

So, the removal of a license plate secured by the license plate security device thereafter requires a security tool 122 to remove the security set screw 118 from the spin barrel 110 to access the head of the machine screw 117. Simply turning the spin barrel 110 will not remove the machine screw 117 because the machined aluminum bottom 120 in the spin barrel 110 creates a slip joint that will not transmit enough torque.

Security tool 122 removes security set screw 118 out of spin barrel 110 by using a piece of any standard electrical, scotch, or duct tape to remove machined slug 115 to gain access to machine screw 117 to then remove spin barrel 110.

Security tool 122 can be kept in the glove box of the car so it is on-hand when needed.

Figure 2:
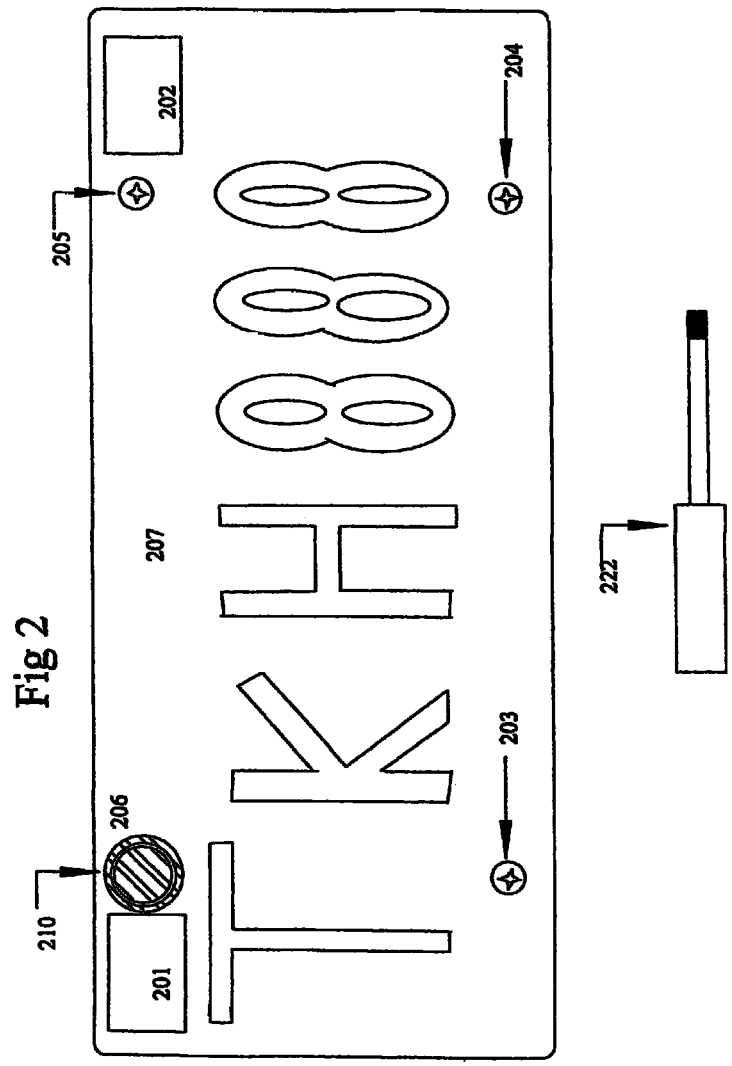
FIG. 2 is a front view diagram of a license plate security device embodiment of the present invention installed and securing a license plate and its frame.

FIG. 2 represents an installed license plate assembly as would be mounted on the rear of a vehicle. A conventional license plate 207 with a year sticker 202 and a month sticker 201 and fastened to the car with four machine screws 203-206. The machine screw 206 is captured inside a license plate security device 210. A security tool 222 secures the license plate security device like that in FIG. 1. Any one or more of the machine screws 203-206 could be fitted with the license plate security device 210 for additional security and/or a more uniform look.

Figure 3:
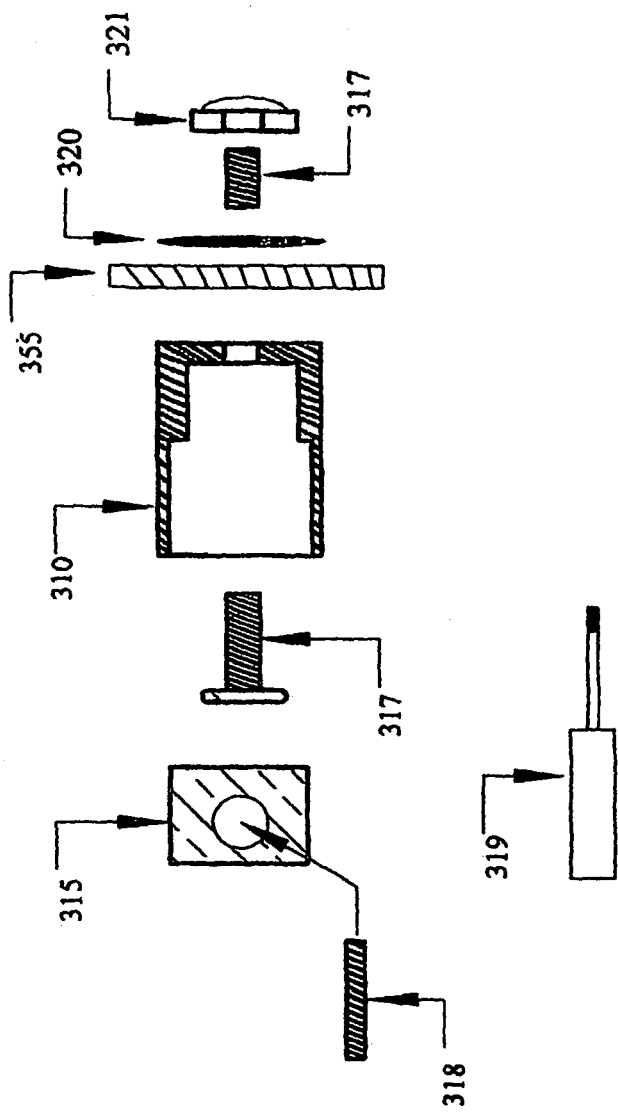
FIG. 3 is an exploded assembly and cross-sectional view diagram of a license plate security device embodiment of the present invention showing the spin barrel and license plate in cross section view; installed on a motorcycle, trailer, or truck needing a washer and nylon insert locking nut.

FIG. 3 illustrates a license plate security assembly 310 that would be used for a truck, trailer, motorcycle, or any other application where nuts would ordinary be used on the backside and that would be exposed and easily removed. A conventional license plate 355 fastened to a fender bracket with four machine screws 317. The machine screw 317 is captured inside a license plate security device. A security tool 319 secures the license plate security device 310 like that in FIGS. 1 and 2. Any one of the machine screws 317 could be fitted with the license plate security device 310. The license plate security assembly differs in that it uses one machine screw 317 with flat washer 320 and nylon insert locking nut 321 on the backside of a fender mounting bracket instead of machined nuts. Removing security device takes security tool 319 to remove security set 318, using standard tape remove machined slug 315, use standard screwdriver or allen to remove machine screw 317 and by holding nylon insert locking nut 321 on the backside of plate will remove the device.

Figure 4:
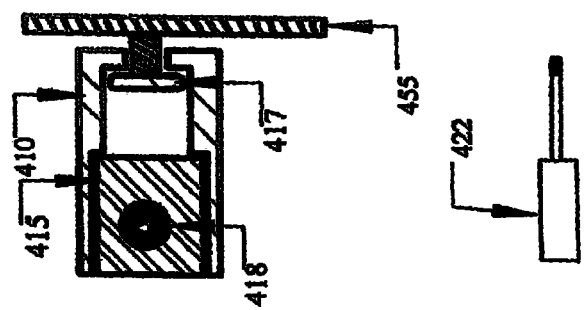
FIG. 4 is an assembly and cross-sectional view diagram of a license plate security device embodiment of the present invention showing the spin barrel and license plate in cross section view; installed on standard automobiles with no access to rear of plate.

FIG. 4 illustrates a license plate security assembly 410 that would be used for a vehicle or any other application where nuts cannot be used on the backside. A conventional license plate 455 fastened to a vehicle with no access to the backside of license plate bracket or insert with machine screw 417. The machine screw 417 is captured inside a license plate security device. A security tool 422 secures the license plate security device 410 like that in FIGS. 1 and 2. Any one of the machine screws 417 could be fitted with the license plate security device 410. Removing security device takes security tool 422 to remove security set screw 418, using standard tape remove machined slug 415, use standard screwdriver or allen to remove machine screw 417 will remove the device.

FIG. 5 illustrates a license plate security assembly 510 that would be used for a truck, trailer, motorcycle, or any other application where nuts would ordinary be used on the backside and that would be exposed and easily removed. A conventional license plate 555 fastened to a fender bracket with four machine screws 517. The machine screw 517 is captured inside a license plate security device. A security tool 522 secures the license plate security device 510 like that in FIGS. 1 and 2. Any one of the machine screws 517 could be fitted with the license plate security device 510. The license plate security assembly differs in that it uses one machine screw 517 with flat washer 520 and nylon insert locking nut 521 on the backside of a fender mounting bracket instead of machined nuts. Removing security device takes security tool 522 to remove security set 518, using standard tape remove machined slug 515, use standard screwdriver or allen to remove machine screw 517 and by holding nylon insert locking nut 521 on the backside of plate will remove the device.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

The invention claimed is:

1. A license plate security device, comprising:
a spin barrel assembly generally in the form of a hollow cylinder with a closed bottom and an open top; a hole sized to accommodate a machine screw with a head in said closed bottom of the spin barrel; and a transverse hole on the side of the cylinder to accommodate a security set screw; and
a machined slug with a transverse threaded hole to accommodate a security set screw is sized to fit completely inside said open end of the spin barrel to rest on a lip inside of the spin barrel wherein the security set screw secures in place the machined slug;
wherein the removal of a license plate secured by the license plate security device thereafter requires a security tool to remove the security set screw to remove the machined slug from the spin barrel to access the head of the machine screw, and
wherein turning the spin barrel only creates a slip joint that will not transmit enough torque to remove the machine screw.

2. The license plate security device of claim 1,
wherein the tight clearance between the spin barrel and machined slug provides a seal to prevent ingress of water and dirt, and thereby preventing the machine screw from rusting.

* * * * *